(12) United States Patent
Ito

(10) Patent No.: US 10,549,746 B2
(45) Date of Patent: Feb. 4, 2020

(54) HYBRID VEHICLE

(71) Applicant: TOYOTA JIDOSHA KABUSHIKI KAISHA, Toyota-shi, Aichi-ken (JP)

(72) Inventor: Yuji Ito, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 169 days.

(21) Appl. No.: 15/810,427

(22) Filed: Nov. 13, 2017

(65) Prior Publication Data

US 2018/0134277 A1 May 17, 2018

(30) Foreign Application Priority Data

Nov. 16, 2016 (JP) .................................. 2016-223209

(51) Int. Cl.
*B60W 10/08* (2006.01)
*B60W 20/15* (2016.01)
(Continued)

(52) U.S. Cl.
CPC ............ *B60W 20/15* (2016.01); *B60W 10/08* (2013.01); *B60W 10/115* (2013.01); *B60W 30/188* (2013.01); *B60K 6/44* (2013.01); *B60W 2510/087* (2013.01); *B60W 2710/083* (2013.01); *Y10S 903/906* (2013.01)

(58) Field of Classification Search
CPC ...... B60W 20/15; B60W 20/14; B60W 10/08; B60W 10/115; B60W 30/18127; B60W 30/188; B60W 30/1843; B60W 2510/087; B60W 2510/1005; B60W 2710/0083; B60W 20/30; B60W 20/00; B60K 6/445; B60K 6/44; B60K 1/02; B60K 6/365;
(Continued)

(56) References Cited

U.S. PATENT DOCUMENTS 7,559,871 B2 * 7/2009 Amano ................. B60K 6/445
477/3
10,259,446 B1 * 4/2019 Shimizu ................. F16H 3/724
(Continued)

FOREIGN PATENT DOCUMENTS

JP 2007-116773 5/2007
JP 2007-203975 8/2007
(Continued)

OTHER PUBLICATIONS

Emadi et al., Power electronics intensive solutions for advanced electric, hybrid electric, and fuel cell vehicular power systems, 2006, IEEE, p. 567-577 (Year: 2006).*
(Continued)

*Primary Examiner* — McDieunel Marc
(74) *Attorney, Agent, or Firm* — Finnegan, Henderson, Farabow, Garrett & Dunner, LLP

(57) ABSTRACT

When a hybrid vehicle slides down during a predetermined drive of the hybrid vehicle with disconnection of a first motor and a second motor from a power storage device by a relay, the hybrid vehicle controls the second motor, such that a torque in a direction according to a shift position is output from the second motor by regenerative drive of the second motor and controls the first motor, such that electric power generated by regenerative drive of the second motor is consumed by driving the first motor.

6 Claims, 9 Drawing Sheets

(51) Int. Cl.
*B60W 10/115* (2012.01)
*B60W 30/188* (2012.01)
*B60K 6/44* (2007.10)

(58) Field of Classification Search
CPC ............. Y02T 10/6239; Y02T 10/7258; Y02T 903/906; B60L 50/16; F16H 3/724
See application file for complete search history.

(56) References Cited

U.S. PATENT DOCUMENTS

| | | | |
|---|---|---|---|
| 2008/0083292 A1* | 4/2008 | Muta | F16H 61/16 74/336 R |
| 2009/0150035 A1* | 6/2009 | Soliman | B60W 20/15 701/54 |
| 2009/0200095 A1* | 8/2009 | Kawasaki | B60K 6/365 180/65.265 |
| 2009/0250278 A1* | 10/2009 | Kawasaki | B60K 1/02 180/65.275 |
| 2009/0314564 A1* | 12/2009 | Okamura | B60L 50/16 180/65.285 |
| 2010/0107608 A1* | 5/2010 | Mitsutani | B60K 6/445 60/285 |
| 2016/0332614 A1* | 11/2016 | Ogura | B60W 20/00 |
| 2018/0178642 A1* | 6/2018 | Hata | B60K 6/445 |
| 2018/0222329 A1* | 8/2018 | Shimizu | B60L 50/16 |
| 2019/0111913 A1* | 4/2019 | Shimizu | B60W 20/30 |

FOREIGN PATENT DOCUMENTS

| | | |
|---|---|---|
| JP | 2008-193772 A | 8/2008 |
| JP | 2012-051457 | 3/2012 |
| JP | 2014-125053 | 7/2014 |
| JP | 2016-175560 A | 10/2016 |

OTHER PUBLICATIONS

Zulkifli et al., Split-parallel in-wheel-motor retrofit hybrid electric vehicle, 2012, IEEE, p. 11-16 (Year: 2012).*
Ning, Power Matching Strategy for Parallel Hybrid Vehicle, 2009, IEEE, p. 1-4 (Year: 2009).*
Agarwal et al., Introduction to hybrid electric vehicles: State of art, 2013, IEEE, p. 1-6 (Year: 2013).*

* cited by examiner

HYBRID VEHICLE

This application claims priority to Japanese Patent Application No. 2016-223209 filed Nov. 16, 2016, the contents of which is incorporated herein by reference

TECHNICAL FIELD

The present disclosure relates to a hybrid vehicle and more specifically relates to a hybrid vehicle equipped with an engine, a planetary gear, two motors and a power storage device.

BACKGROUND

In a hybrid vehicle configured such that an engine, a first motor generator, and a second motor generator along with a driveshaft coupled with wheels are respectively connected with a carrier, a sun gear and a ring gear of a planetary gear and such that the first motor generator and the second motor generator transmit electric power to and from a battery, a proposed configuration causes a regenerative torque to be generated from the first motor generator when the vehicle is likely to slide down on a slope due to restriction of an output torque from the second motor generator (for example, JP 2007-203975A). The hybrid vehicle of this configuration performs such control to apply a torque in a direction of suppressing the slide-down from the first generator to the driveshaft via the planetary gear.

CITATION LIST

Patent Literature

PTL 1: JP2007-203975

SUMMARY

In the event of slid-down of the vehicle, the above control of the hybrid vehicle suppresses an increase in speed of the slide-down of the vehicle by regenerative drive of both the first motor generator and the second motor generator. When the vehicle slides down during a predetermined drive of the hybrid vehicle with disconnection of the first and the second motor generators from the battery by a relay, however, it is impossible to perform regenerative drive of both the first motor generator and the second motor generator. There is accordingly a need for another control method to suppress an increase in speed of the slide-down of the vehicle.

A hybrid vehicle of the present disclosure mainly aims to suppress an increase in speed of slide-down of the vehicle when the vehicle slides down in the state that two motors are disconnected from a power storage device by the relay.

In order to achieve the above main object, the hybrid vehicle of the present disclosure may be implemented by the following aspects.

A hybrid vehicle of this aspect may include an engine; a first motor; a planetary gear configured to include three rotational elements that are sequentially arrayed in an alignment chart and are respectively connected with the first motor, the engine, and a driveshaft coupled with drive wheels; a second motor connected with the driveshaft; a power storage device configured to transmit electric power to and from the first motor and the second motor; and a relay configured to connect and disconnect the first motor and the second motor with and from the power storage device, the hybrid vehicle may further include a control device programmed to, when the vehicle slides down during a predetermined drive of the hybrid vehicle with disconnection of the first motor and the second motor from the power storage device by the relay, control the second motor, such that a torque in a direction according to a shift position is output from the second motor by regenerative drive of the second motor and control the first motor, such that electric power generated by regenerative drive of the second motor is consumed by driving the first motor.

When the vehicle slides down during the predetermined drive of the hybrid vehicle with disconnection of the first motor and the second motor from the power storage device by the relay, the hybrid vehicle of this aspect controls the second motor, such that a torque in the direction according to the shift position is output from the second motor by regenerative drive of the second motor and controls the first motor, such that electric power generated by regenerative drive of the second motor is consumed by driving the first motor. It is impossible to perform regenerative drive of both the first motor and the second motor in the event of slide-down of the vehicle during the predetermined drive. When the vehicle slides down during the predetermined drive, the hybrid vehicle of this aspect causes the electric power generated by regenerative drive of the second motor to be consumed by driving the first motor and enables a torque in the direction according to the shift position in the direction of suppressing the slide-down of the vehicle) to be output from the second motor. This configuration suppresses an increase in speed of the slide-down of the vehicle. This results in providing a more sufficient time for the brake operation when the driver desires to stop the vehicle. In the event of slide-down of the vehicle during the predetermined drive, the engine may be subjected to no-load operation or may be subjected to cutting of fuel supply.

DETAILED DESCRIPTION OF EMBODIMENTS

The following describes some aspects of the present disclosure with reference to embodiments.

Figure 1:
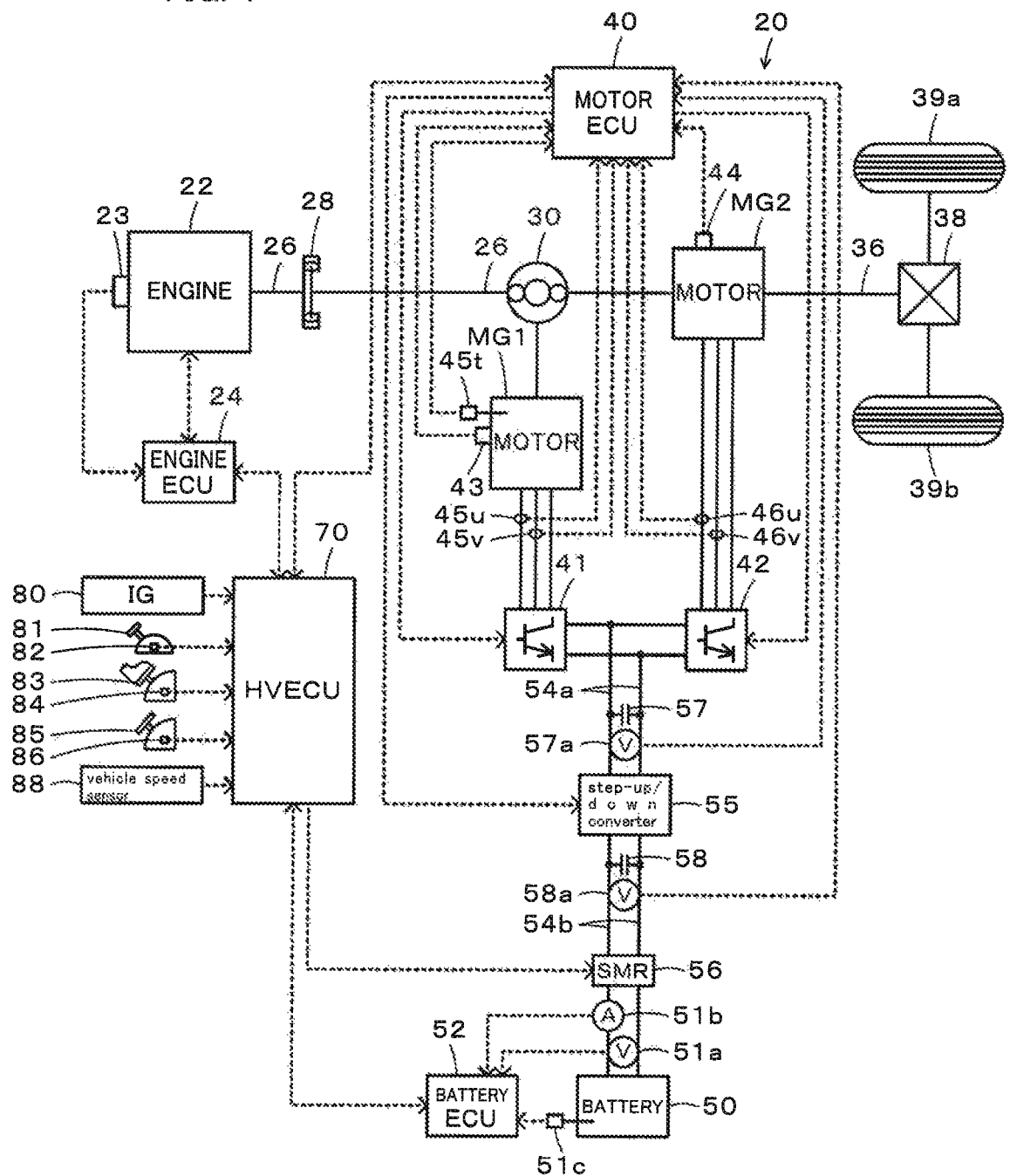
FIG. 1 is a configuration diagram illustrating the schematic configuration of a hybrid vehicle 20 according to one embodiment of the disclosure.
Figure 2:
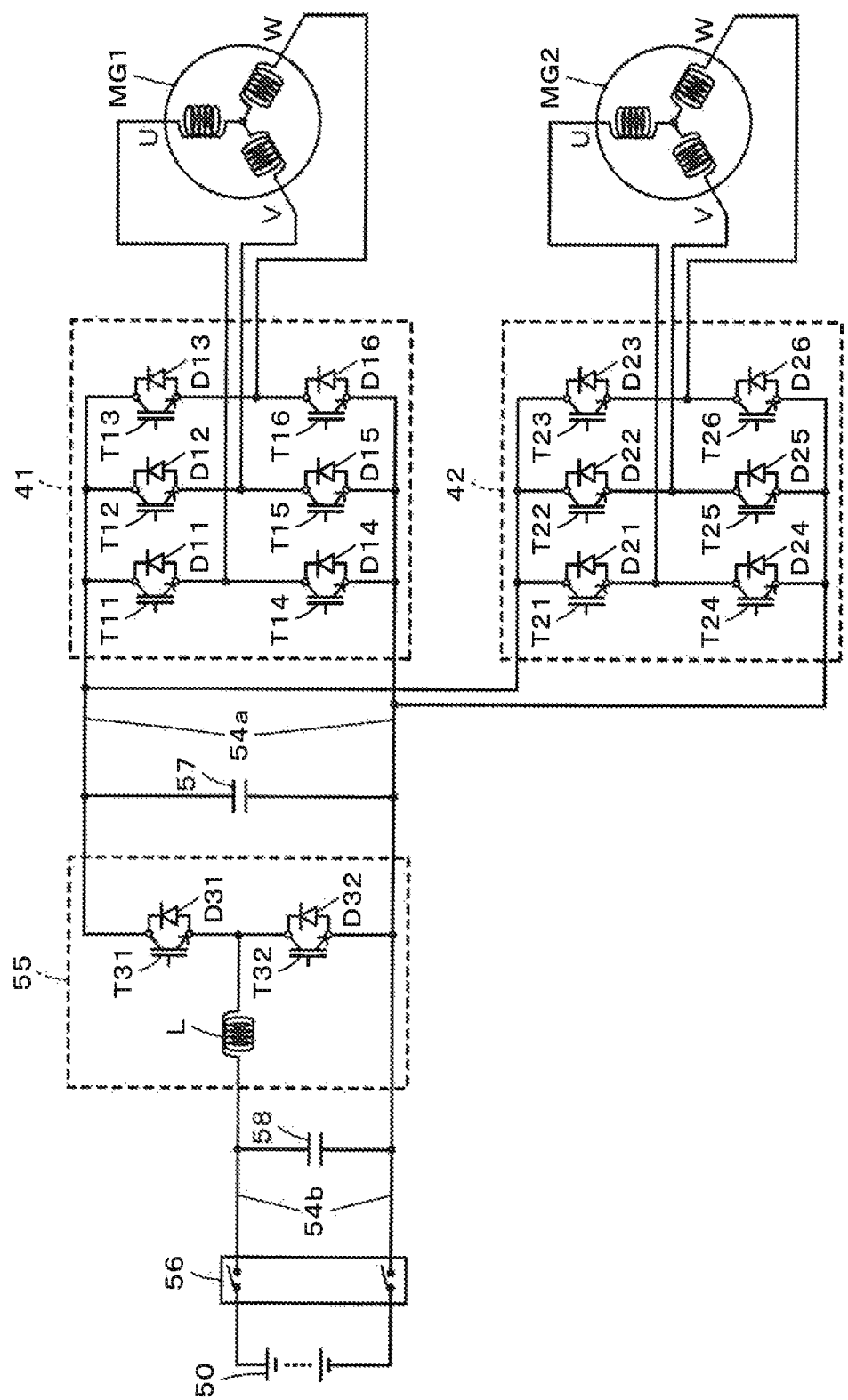
FIG. 2 is a configuration diagram illustrating the schematic configuration of an electric drive system including motors MG1 and MG2.

FIG. 1 is a configuration diagram illustrating the schematic configuration of a hybrid vehicle according to one embodiment of the disclosure and FIG. 2 is a configuration diagram illustrating the schematic configuration of an electric drive system including motors MG1 and MG2. As illustrated, the hybrid vehicle 20 of the embodiment includes an engine 22, a planetary gear 30, motors MG1 and MG2, inverters 41 and 42, a step-up/down converter 55, a battery 50 as a power storage device, a system main relay 56 and a hybrid electronic control unit (hereinafter referred to as "HVECU") 70.

The engine 22 is configured as an internal combustion engine to output power using, for example, gasoline or light oil as a fuel. This engine 22 is subjected to operation control by an engine electronic control unit (hereinafter referred to as "engine ECU") 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22, for example, a crank angle θcr from a crank position sensor 23 configured to detect the rotational position of a crankshaft 26 of the engine 22, are input into the engine ECU 24 via the input port. Various control signals for operation control of the engine 22 are output from the engine ECU 24 via the output port. The engine ECU 24 is connected with the HVECU 70 via the respective communication ports. The engine ECU 24 calculates a rotation speed Ne of the engine 22, based on the crank angle θcr input from the crank position sensor 23.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 39a and 39v via a differential gear 38. The planetary gear 30 further includes a carrier that is connected with the crankshaft 26 of the engine 22 via a damper 28.

The motor MG1 is configured as a synchronous motor generator having a rotor with permanent magnets embedded therein and a stator with three-phase coils wound thereon. As described above, the rotor is connected with the sun gear of the planetary gear 30. The motor MG2 is also configured as a synchronous motor generator like the motor MG1 and includes a rotor that is connected with the driveshaft 36.

As shown in FIG. 2, the inverter 41 is connected with high voltage-side power lines 54a and includes six transistors T11 to T16 and six diodes D11 to D16 that are connected in parallel to and in a reverse direction to the transistors T11 to T16. The transistors T11 to T16 are arranged in pairs, such that two transistors in each pair respectively serve as a source and a sink relative to a positive electrode line and a negative electrode line of the high voltage-side power lines 54a. The respective phases of the three-phase coils (U phase, V phase and W phase) of the motor MG1 are connected with connection points of the respective pairs of the transistors T11 to T16. Accordingly, when a voltage is applied to the inverter 41, a motor electronic control unit (hereinafter referred to as "motor ECU") 40 serves to regulate the rates of ON times of the respective pairs of the transistors T11 to T16, such as to provide a rotating magnetic field in the three-phase coils and thereby rotate and drive the motor MG1. Like the inverter 41, the inverter 42 is also connected with the high voltage-side power lines 54a and includes six transistors T21 to T26 and six diodes D21 to D26. When a voltage is applied to the inverter 42, the motor ECU 40 serves to regulate the rates of ON times of the respective pairs of the transistors T21 to T26, such as to provide a rotating magnetic field in the three-phase coils and thereby rotate and drive the motor MG2.

The step-up/down converter 55 is connected with the high voltage-side power lines 54a and with low voltage-side power lines 54b and includes two transistors T31 and T32, two diodes D31 and D32 connected in parallel to and in reverse direction to the transistors T31 and T32, and a reactor L. The transistor T31 is connected with the positive electrode line of the high voltage-side power lines 54a. The transistor T32 is connected with the transistor 31 and with negative electrode lines of the high voltage-side power lines 54a and of the low voltage-side power lines 54b. The reactor L is connected with a connection point between the transistors T31 and T32 and with a positive electrode line of the low voltage-side power lines 54b. The motor ECU 40 serves to regulate the rates of ON times of the transistors T31 and T32, such that the step-up/down converter 55 steps up an electric power of the low voltage-side power lines 54b and supplies the stepped-up electric power to the high voltage-side power lines 54a, while stepping down an electric power of the high voltage-side power lines 54a and supplying the stepped-down electric power to the low voltage-side power lines 54b. A smoothing capacitor 57 is mounted to the positive electrode line and the negative electrode line of the high voltage-side power lines 54a. A smoothing capacitor 58 is mounted to the positive electrode line and the negative electrode line of the low voltage-side power lines 54b.

The motor ECU 40 is configured as a CPU-based microprocessor and includes a ROM configured to store processing programs, a RAM configured to temporarily store data, input/output ports and a communication port, in addition to the CPU, although not being illustrated. As shown in FIG. 1, signals from various sensors required for drive control of the motors MG1 and MG2 and the step-up/down converter 55 are input into the motor ECU 40 via the input port. The signals input into the motor ECU 40 include, for example, rotational positions θm1 and θm2 from rotational position detection sensors 43 and configured to detect the rotational positions of the respective rotors of the motors MG1 and MG2 phase currents Iu1, Iv1, Iu2 and Iv2 from current sensors 45u, 45v, 46u and 46v configured to detect electric currents flowing in the respective phases of the motors MG1 and MG2, and a motor temperature tm1 from a temperature sensor 45t mounted to the motor MG1. The input signals also include a voltage VH of the capacitor 57 (i.e., voltage of the high voltage-side power lines 54a) from a voltage sensor 57a mounted between terminals of the capacitor 57 and a voltage VL of the capacitor 58 (i.e., voltage of the low voltage-side power lines 54b) from a voltage sensor 58a mounted between terminals of the capacitor 58. Various control signals for drive control of the motors MG1 and MG2 and the step-up/down converter 55 are output from the motor ECU 40 via the output port. The signals output from the motor ECU 40 include, for example, switching control signals to the transistors T11 to T16 of the inverter 41 and the transistors T21 to T26 of the inverter 42 and switching control signals to the transistors T31 and T32 of the step-up/down converter 55. The motor ECU 40 is connected with the HVECU 70 via the respective communication ports. The motor ECU 40 calculates electrical angles θe1 and θe2 and rotation speeds Nm1 and Nm2 of the respective motors MG1 and MG2, based on the rotational positions θm1 and θm2 of the respective rotors of the motors MG1 and MG2 input from the rotational position detection sensors 43 and 44.

The battery 50 is configured as, for example, a lithium ion rechargeable battery or a nickel metal hydride battery and is connected with the low voltage-side power lines 54b. This battery 50 is under management of a battery electronic control unit (hereinafter referred to as "battery ECU") 52.

The battery ECU 52 is configured as a CPU-based microprocessor and includes ROM configured to store processing programs, a RAM configured to temporarily store data, input/output ports and a communication port, in addition to the CPU, although not being illustrated. Signals from various sensors required for management of the battery 50 are input into the battery ECU 52 via the input port. The signals input into the battery ECU 52 include, for example, a voltage Vb of the battery 50 from a voltage sensor 51a mounted between terminals of the battery 50, a current Ib of the battery 50 from a current sensor 51b mounted to an output terminal of the battery 50, and a temperature Tb of the battery 50 from a temperature sensor 51c mounted to the battery 50. The battery ECU 52 is connected with the HVECU 70 via the respective communication ports. The battery ECU 52 calculates a state of charge SOC, based on an integrated value of the current Ib of the battery 50 from the current sensor 51b. The state of charge SOC denotes a ratio of the capacity of electric power dischargeable from the battery 50 to the overall capacity of the battery 50.

The system main relay 56 is provided on the battery 50-side of the capacitor 58 in the low voltage-side power lines 54b. This system main relay 56 is controlled on and off by the HVECU 70 to connect and disconnect the battery 50 with and from the step-up/down converter 55-side.

The HVECU 70 is configured as a CPU-based microprocessor and includes a ROM configured to store processing programs, a RAM configured to temporarily store data, input/output ports and a communication port, in addition to the CPU, although not being illustrated. Signals from various sensors are input into the HVECU 70 via the input port. The signals input into the HVECU 70 include, for example, an ignition signal from an ignition switch 80 and a shift position SP from a shift position sensor 82 configured to detect an operating position of a shift lever 81. The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. The HVECU 70 is connected with the engine ECU 24, the motor ECU 40 and the battery ECU 52 via the respective communication ports as described above.

Examples of the shift position SP provided herein include a parking position (P position), a reverse position (R position), a neutral position (N position) and a drive position (D position).

The hybrid vehicle 20 of the embodiment having the configuration described above may be driven, for example, in a hybrid drive mode (HV drive mode), in an electric drive mode (EV drive mode), or battery-less drive mode. The HV drive mode denotes a drive mode in which the hybrid vehicle 20 is driven with operating the engine 22 and driving the motors MG1 and MG2. The EV drive mode denotes a drive mode in which the hybrid vehicle 20 is driven with stopping operation of the engine 22 and driving the motor MG2. The battery-less drive mode denotes a drive mode in which the hybrid vehicle 20 is driven with operating the engine 22 and driving the motors MG1 and MG2 without charging and discharging the battery 50.

Figure 3:
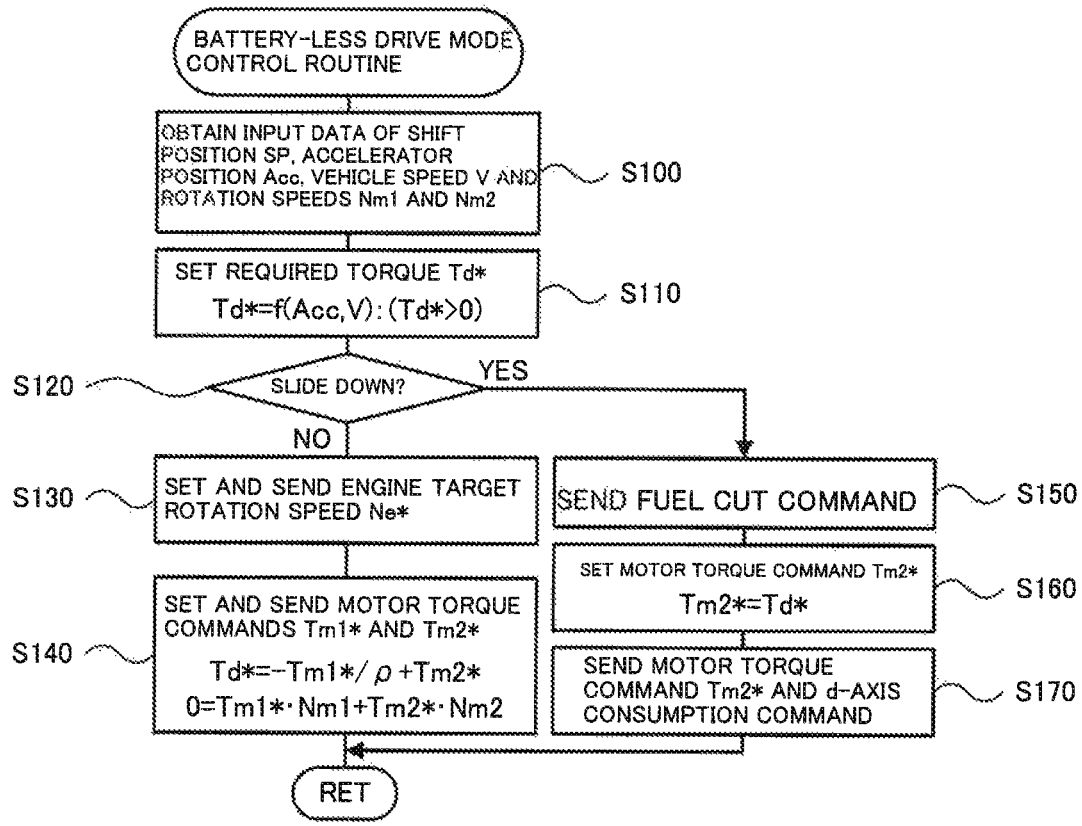
FIG. 3 is a flowchart showing one example of a battery-less drive mode control routine performed by an HVECU 70 according to the embodiment.

The following describes operations of the hybrid vehicle 20 of the embodiment having the above configuration and more specifically series of operations in the battery-less drive mode. FIG. 3 is a flowchart showing one example of a battery-less drive mode control routine performed by an HVECU according to the embodiment. This routine is repeatedly performed in the battery-less drive mode. The battery-less drive mode is selected, for example when there is an abnormality in the battery 50, when there is an abnormality in the step-up/down converter 55 or when there is an abnormality in the system main relay 56. In the battery-less drive mode, the system main relay 56 is turned off (to disconnect the inverters 41 and 42 from the battery 50), and the step-up/down converter 55 is stopped.

When the battery-less drive mode control routine of FIG. 3 is triggered, the HVECU 70 first obtains input data, for example, the shift position SP, the accelerator position Acc, the vehicle speed V and the rotation speed Nm1 and Nm2 of the motors MG1 and MG2 (step S100). The shift position SP input here is a position detected by the shift position sensor 82. The accelerator position Acc input here is a value detected by the accelerator pedal position sensor 84. The vehicle speed V input here is a value detected by the vehicle speed sensor 88. The rotation speeds Nm1 and Nm2 of the motors MG1 and MG2 input here are values calculated based on the rotational positions θm1 and θm2 of the respective rotors of the motors MG1 and MG2 detected by the rotational position detection sensors 43 and 44.

After obtaining the input data, the HVECU 70 sets a required torque Td* required for driving (required for the driveshaft 36), based on the input shift position SP, accelerator position Acc and vehicle speed V (step S110). In the accelerator-on condition, a positive value (value for forward driving) is set to the required torque Td* at the shift. position SP set to the D position, whereas a negative value (value for reverse driving) is set to the required torque Td* at the shift position SP set to the R position.

The HVECU 70 subsequently determines whether the vehicle slides down or not, using the shift position SP and the rotation speed Nm2 of the motor MG2 (i.e., rotation speed Nd of the driveshaft 36) (step S120). It is determined that the vehicle does not slide down when the rotation speed Nm2 of the motor MG2 is equal to or higher than value 0 at the shift position SP set to the D position or when the rotation speed Nm2 of the motor MG2 is equal to or lower than value 0 at the shift position SP set to the R position. In this case, the HVECU 70 sets a target rotation speed Ne* of the engine 22 and sends the set target rotation speed Ne to the engine ECU 24 (step S130), sets torque commands Tm1* and Tm2* of the motors MG1 and MG2 to satisfy Expressions (1) and (2) given below and sends the set torque commands Tm1* and Tm2* to the motor ECU 40 (step S140) and then terminates this routine. When receiving the target rotation speed Ne* of the engine 22, the engine ECU 24 performs, for example, intake air amount control, fuel injection control and ignition control of the engine 22, such that the engine 22 is rotated at the target rotation speed Ne*. When receiving the torque commands Tm1* and Tm2* of the motors MG1 and MG2, the motor ECU 40 performs drive control of the motors MG1 and MG2 (i.e., performs switching control of the transistors T11 to T16 of the inverter 41 and the transistors T21 to T26 of the inverter 42) such that torques corresponding to the torque commands Tm1* and Tm2* are output from the motors MG1 and MG2.

$$Td^* = Tm1^*/\rho + Tm2^* \qquad (1)$$

$$0 = Tm1^* \cdot Nm1 + Tm2^* \cdot Nm2 \qquad (2)$$

The target rotation speed Ne* of the engine 22 may be set to a value that tends to increase with an increase in accelerator position Acc or may be set to a fixed value (for example, rotation speed that allows the engine 22 to be driven, with high efficiency).

Figure 4:
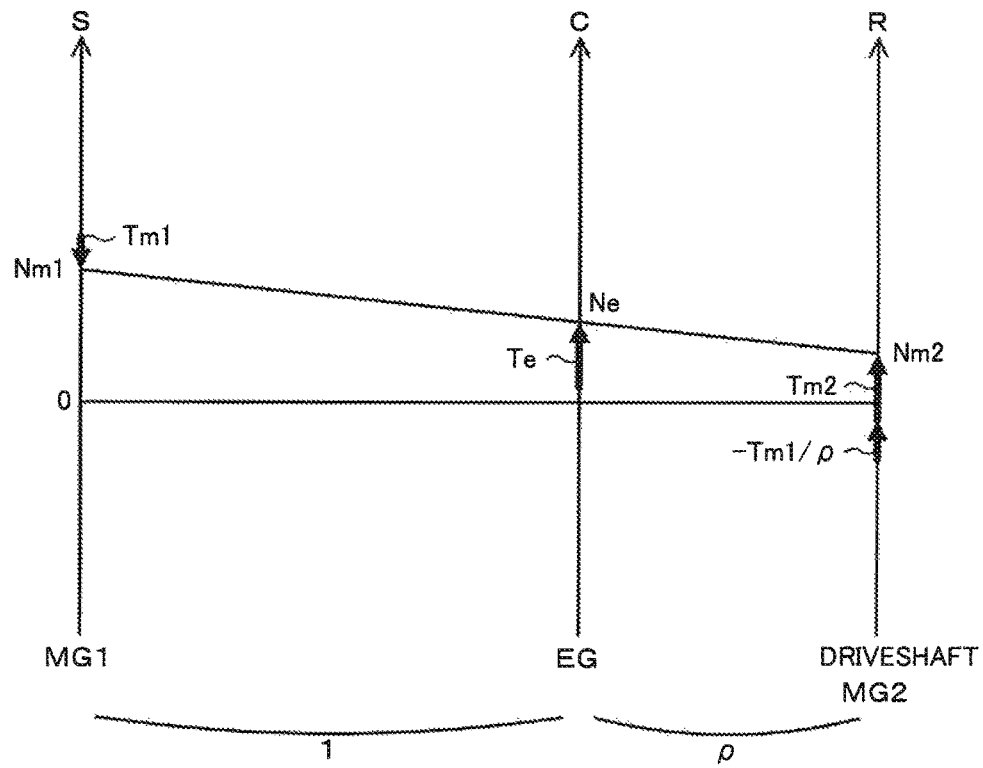
FIG. 4 is a diagram illustrating one example of an alignment chart in the case where the vehicle does not slide down at a shift position SP set to a D position in a battery-less drive mode.
Figure 5:
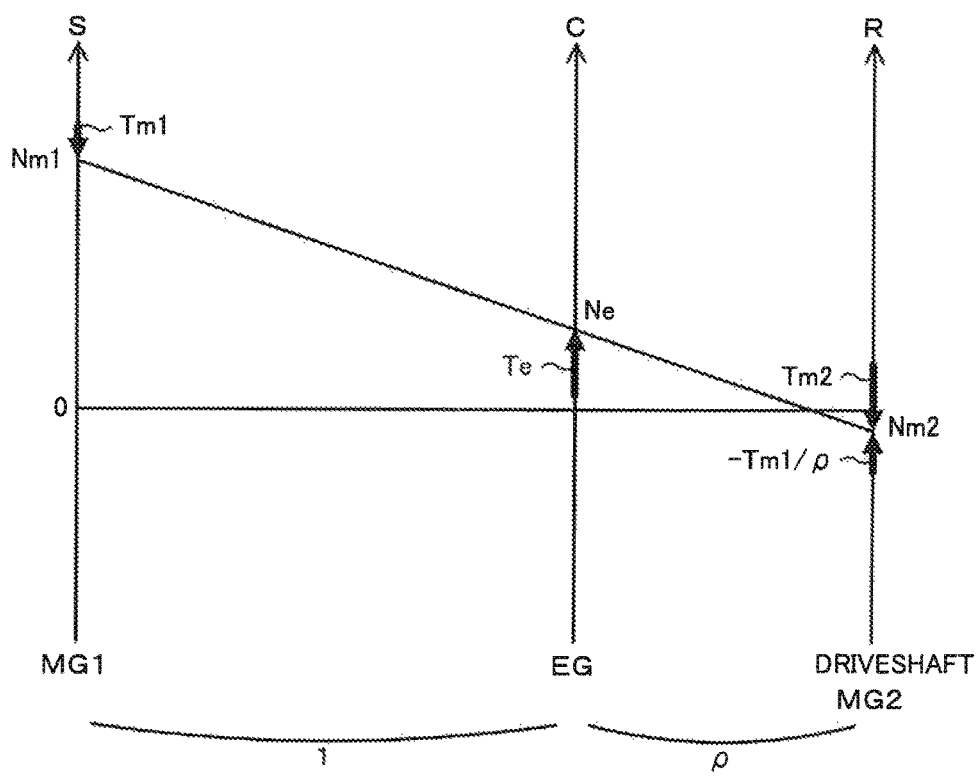
FIG. 5 is a diagram illustrating one example of the alignment chart in the case where the vehicle does not slide down at the shift position SP set to an R position in the battery-less drive mode.

Expression (1) given above indicates a relationship that the required torque Td* is equal to the total torque of the driveshaft 36 when the motors MG1 and MG2 are driven with the torque commands Tm1* and Tm2*. Expression (2) given above indicates a relationship that the sum of an electric power Pm1 of the motor MG1 obtained as the product of the torque command Tm1* and the rotation speed Nm1 of the motor MG1 and an electric power Pm2 of the motor MG2 obtained as the product of the torque command Tm2* and the rotation speed Nm2 of the motor MG2 is equal to value 0. FIG. 4 is a diagram illustrating one example of an alignment chart in the case where the vehicle does not slide down at a shift position SP set to a D position in a battery-less drive mode. FIG. 5 is a diagram illustrating one example of the alignment chart in the case where the vehicle does not slide down at the shift position SP set to an R position in the battery-less drive mode. In FIG. 4 and FIG. 5, an S axis on the left side shows the rotation speed of the sun gear of the planetary gear 30 that is equal to the rotation speed Nm1 of the motor MG1. A C axis shows the rotation speed of the carrier of the planetary gear 30 that is equal to the rotation speed Ne of the engine 22. An R axis shows the rotation speed of the ring gear of the planetary gear 30 (i.e., the rotation speed of the driveshaft 36) that is equal to the rotation speed Nm2 of the motor MG2. "ρ" denotes a gear ratio of the planetary gear 30 (number of teeth of the sun gear/number of teeth of the ring gear). Two thick arrows on the R axis respectively indicate a torque that is output from the motor MG1 and is applied to the driveshaft 36 via the planetary gear 30 and a torque that is output from the motor MG2 and is applied to the driveshaft 36. Each upward thick arrow indicates a positive torque, and each downward thick arrow indicates a negative torque. Expression (1) is readily derived from the alignment charts of FIGS. 4 and 5. As understood from FIG. 4, at the shift position SP set to the D position, the motor MG1 has a positive value of the rotation speed Nm1 and a negative value of the torque command Tm1* (regenerative drive) and accordingly has negative value of the electric power Pm1 (generate the electric power). The motor MG2, on the other hand, has positive values of both the rotation speed Nm2 and the torque command Tm2* (power drive) and accordingly has a positive value of the electric power Pm2 (consume the electric power). Additionally, as understood from FIG. 5, at the shift position SP set to the R position, the motor MG1 has a positive value of the rotation speed Nm1 and a negative value of the torque command Tm1* (regenerative drive) and accordingly has a negative value of the electric power Pm1 (generate the electric power). The motor MG2, on the other hand, has negative values of both the rotation speed Nm2 and the torque command Tm2* (power drive) and accordingly has a positive value of the electric power Pm2 (consume the electric power). Under such conditions, the engine 22 is subjected to load operation to be rotated at the target rotation speed Ne* with outputting a positive torque Te according to the torque from the motor MG1 and the gear ratio ρ of the planetary gear 30.

Figure 6:
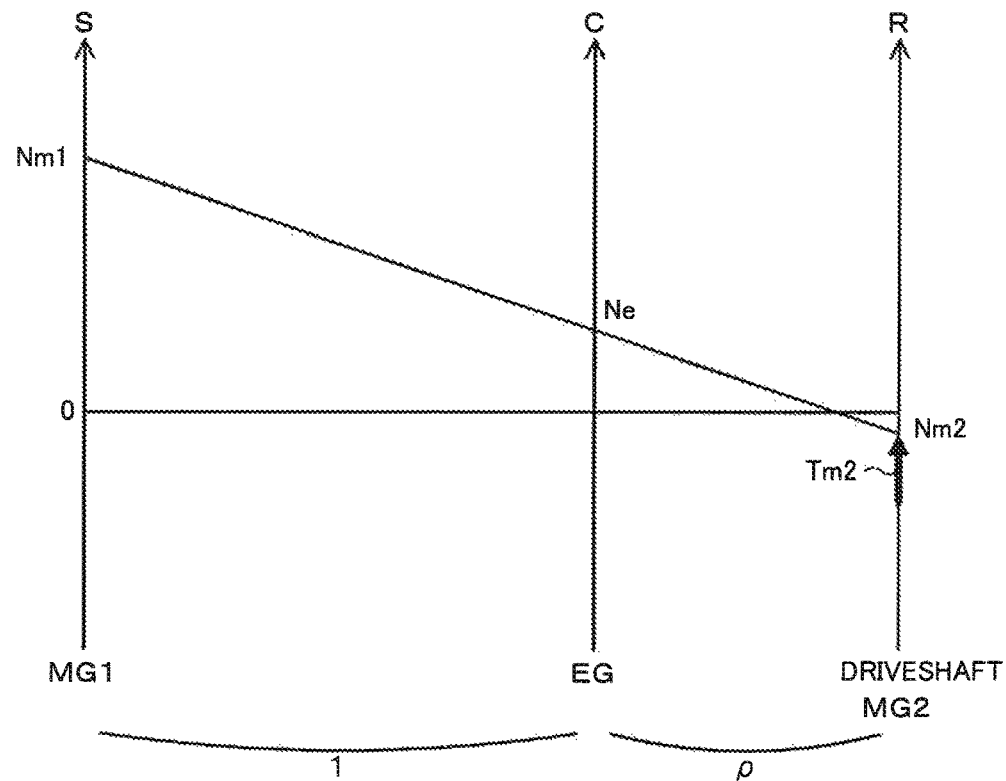
FIG. 6 is a diagram illustrating one example of the alignment chart when a positive torque is output from the motor MG2 and a d-axis current is flowed in the motor MG1 in the case where the vehicle slides down at the shift position SP set to the D position in the battery-less drive mode.
Figure 7:
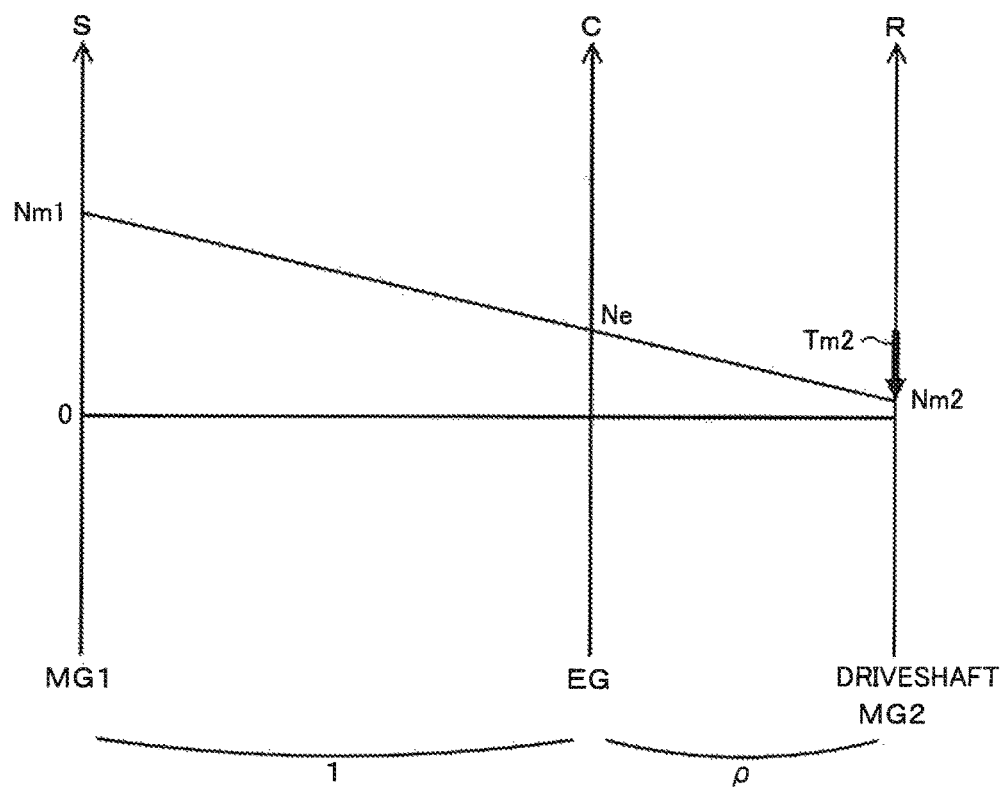
FIG. 7 is a diagram illustrating one example of the alignment chart when a negative torque is output from the motor MG2 and the d-axis current is flowed in the motor MG1 in the case where the vehicle slides down at the shift position SP set to the R position in the battery-less drive mode.

At step S120, the HVECU 70 determines that the vehicle slides down, when the rotation speed Nm2 of the motor MG2 is lower than 0 at the shift position SP set to the D position or when the rotation speed Nm2 of the motor MG2 is higher than 0 at the shift position SP set to the R position. The HVECU 70 subsequently sends a fuel cut command for the engine 22 to the engine ECU 24 (step S150), sets the required torque Td* to the torque command Tm2* of the motor MG2 (step S160), sends the set torque command Tm2* of the motor MG2 and a d-axis consumption command to the motor ECU 40 (step S170) and then terminates this routine. When receiving the fuel cut command, the engine ECU 24 cuts the fuel supply to the engine 22 (i.e., stops fuel injection). The motor ECO 40 performs drive control of the motor MG2 as described above. In the event of slide-down of the vehicle, regenerative drive of the motor MG2 is required, in order to output a torque according to the shift position SP from the motor MG2, as described in detail later. When receiving the d-axis consumption command, the motor ECU 40 performs drive control or the motor MG1 (i.e., performs switching control of the transistors T11 to T16 of the inverter 41), such that the electric power generated by regenerative drive of the motor MG2 is consumed without output of a torque from the motor MG1 (i.e., with the flow of d-axis current in the motor MG1). In the description below, such drive control of the motor MG1 is called "d-axis consumption control", FIG. 6 is a diagram illustrating one example of the alignment chart when a positive torque is output from the motor MG2 and a d-axis current is flowed in the motor MG1 in the case where the vehicle slides down at the shift position SP set to the C position in the battery-less drive mode, FIG. 7 is a diagram illustrating one example of the alignment chart when a negative torque is output from the motor MG2 and the d-axis current is flowed in the motor MG1 in the case where the vehicle slides down at the shift position SP set to the R position in the battery-less drive mode. As understood from FIG. 6, in the event of slide-down of the vehicle at the shift position SP set to the D position, since the motor MG2 has a negative value of the rotation speed Nm2, regenerative drive of the motor MG2 is required, in order to output a torque according to the shift position SP (positive torque) from the motor MG2. Additionally, as understood from FIG. 7, in the event of slide-down of the vehicle at the shift position SP set to the R position, since the motor MG2 has a positive value of the rotation speed Nm2, regenerative drive of the motor MG2 is required, in order to output a torque according to the shift position SP (negative torque) from the motor MG2. In the battery-less drive mode, however, the system main relay 56 serves to disconnect the motors MG1 and MG2 (i.e., the inverters 41 and 42) from the battery 50. It is thus impossible to perform regenerative drive both the motors MG1 and MG2. By taking into account the foregoing, the configuration of this embodiment performs the d-axis consumption control as the drive control of the motor MG1. More specifically, the d-axis consumption control performs drive control of the motor MG1, such that the d-axis current allowing for consumption of the electric power Pm2 (=Tm2*·Nm2) of the motor MG2 in the form of heat is flowed in the motor MG1. This configuration enables the motor MG2 to output a torque in a direction according to the shift position SP (i.e., in a direction of suppressing slide-down of the vehicle) and thereby suppresses an increase in speed of the slide-down of the vehicle. This results in providing a more sufficient time for the brake operation when the driver desires to stop the vehicle.

As described above, in the event of slide-down of the vehicle in the battery-less drive mode, the hybrid vehicle 20 of the embodiment performs drive control of the motor MG2, such that a torque in the direction according to the shift position SP is output from the motor MG2 by regenerative drive of the motor MG2. The hybrid vehicle 20 of the embodiment also performs the d-axis consumption control that is the drive control of the motor MG1, such that the electric power generated by regenerative drive of the motor MG2 is consumed without output of a torque from the motor MG1 (with the flow of d-axis current in the motor MG1). Consumption of the electric power generated by regenerative drive of the motor MG2 in the form of heat without output of a torque from the motor MG1 (with the flow of d-axis current) enables the motor MG2 to output a torque in the direction according to the shift position SP (i.e., in the direction of suppressing slide-down of the vehicle) and thereby suppresses an increase in speed of the slide-down of the vehicle. This results in providing a more sufficient time for the brake operation when the driver desires to stop the vehicle.

The hybrid vehicle 20 of the embodiment cuts off the fuel supply to the engine 22 in the event of slide-down of the vehicle in the battery-less drive mode. Even in the event of slide-down of the vehicle, a modification may operate the engine 22 to be rotated at the target rotation speed Ne* that is similar to the target rotation speed Ne* under the condition of no slide-down of the vehicle.

In the hybrid vehicle 20 of the embodiment, the HVECU 70 performs the batteryless drive mode control routine of FIG. 3 in the battery-less drive mode. Modifications may perform other battery-less drive mode control routines shown in FIGS. 8 to 10. These modifications are sequentially described below.

Figure 8:
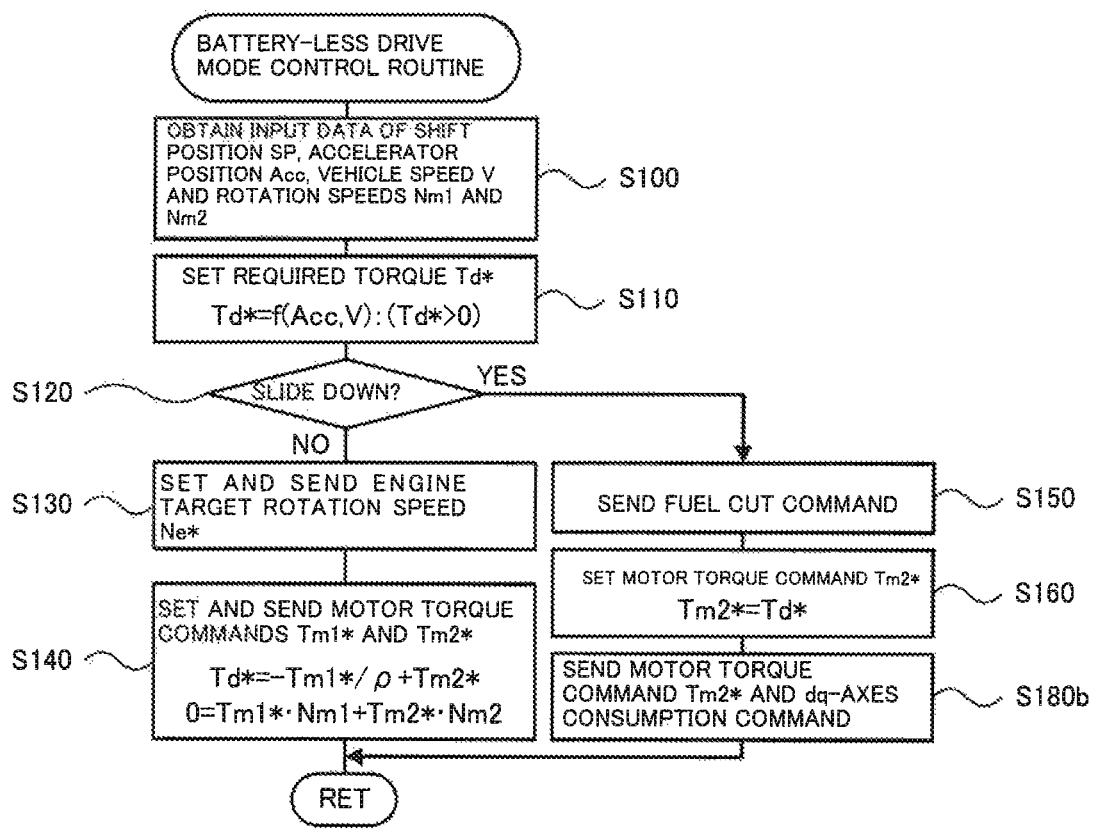
FIG. 8 is a flowchart showing one example of the battery-less drive mode control routine performed by the HVECU 70 according to a modification.

The following describes the battery-less drive mode control routine of FIG. 8. This routine is similar to the battery-less drive mode control routine of FIG. 3, except replacement of the processing of step S170 with the processing of step S180b. The like steps in the battery-less drive mode control routine of FIG. 8 to those in the battery-less drive mode control routine of FIG. 3 are expressed by the like step numbers, and their detailed description is omitted.

In the battery-less drive mode control routine of FIG. 8, when it is determined at step S120 that the vehicle slides down, the HVECU 70 sends the fuel cut command for the engine 22 to the engine ECU 24 (step S150), sets the required torque Td* to the torque command Tm2* of the motor MG2 (step S160), sends the set torque command Tm2* of the motor MG2 and a dq-axes consumption command to the motor ECU 40 (step S180b) and then terminates this routine. When receiving the dq-axes consumption command, the motor ECU 40 performs drive control of the motor MG1 (i.e., performs switching control of the transistors T11 to T16 of the inverter 41), such that the electric power generated by regenerative drive of the motor MG2 is consumed by output of a torque in a direction of motoring the engine 22 from the motor MG1 by power drive of the motor MG1. In the description below, such drive control of the motor MG1 is called "dq-axes consumption control".

Figure 11:
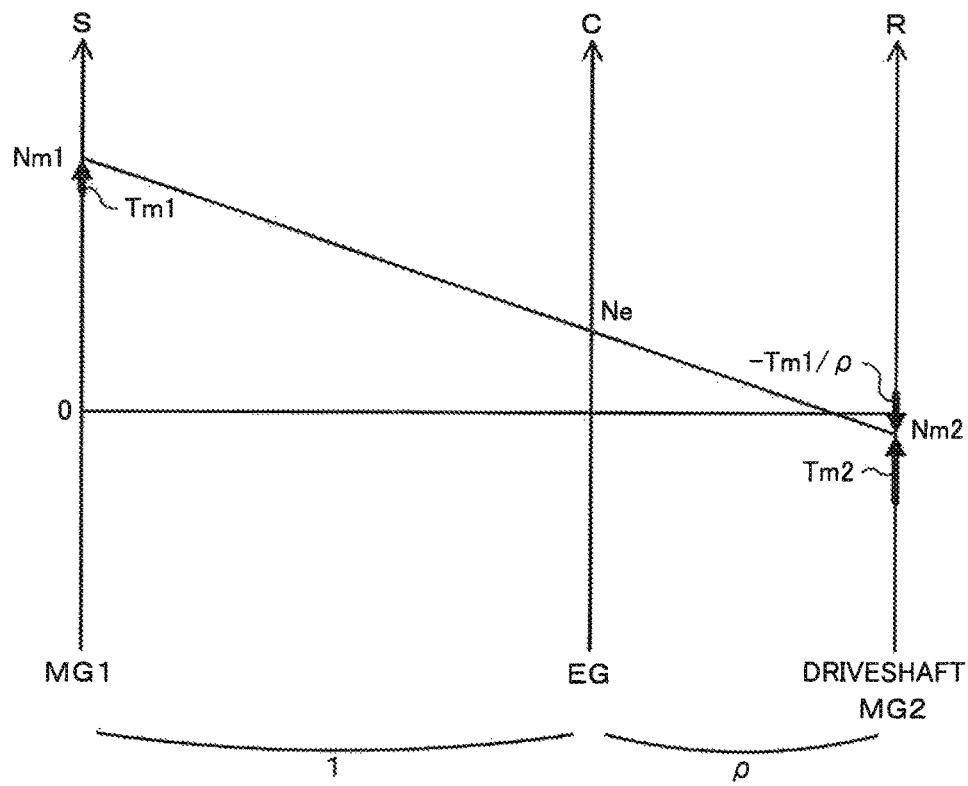
FIG. 11 is a diagram illustrating one example of the alignment chart when a positive torque is output from the motor MG2 and a positive torque is output from the motor MG1 in the case where the vehicle slides down at the shift positron SP set to the D position in the battery-less drive mode.

FIG. 11 is a diagram illustrating one example of the alignment chart when a positive torque is output from the motor MG2 and a positive torque is output from the motor MG1 in the case where the vehicle slides down at the shift position SP set to the position in the battery-less drive mode. As in the case of FIG. 6 described above, in the case of FIG. 11, regenerative drive of the motor MG2 is required, in order to output a torque according to the shift position SP (positive torque) from the motor MG2. In the battery-less drive mode, however, it is impossible to perform regenerative drive of both the motors MG1 and MG2. This modification accordingly performs the dq-axes consumption control as drive control of the motor MG1. More specifically, the dq-axes consumption control performs drive control of the motor MG1, such that the electric power Pm2 of the motor MG2 is consumed in the form of power (torque) and heat and that the d-axis current and the q-axis current are flowed in the motor MG1 to provide an absolute value of a torque (−Tm1/ρ) that is smaller than the absolute value of the torque Tm2. Like the embodiment described above, this configuration suppresses an increase in speed of the slide-down of the vehicle. Compared with the configuration that performs the d-axis consumption control, this configuration, also suppresses a temperature rise of the motor MG1, while reducing a total torque in the forward direction of the driveshaft 36 by the presence of the torque (−Tm1/ρ).

Figure 12:
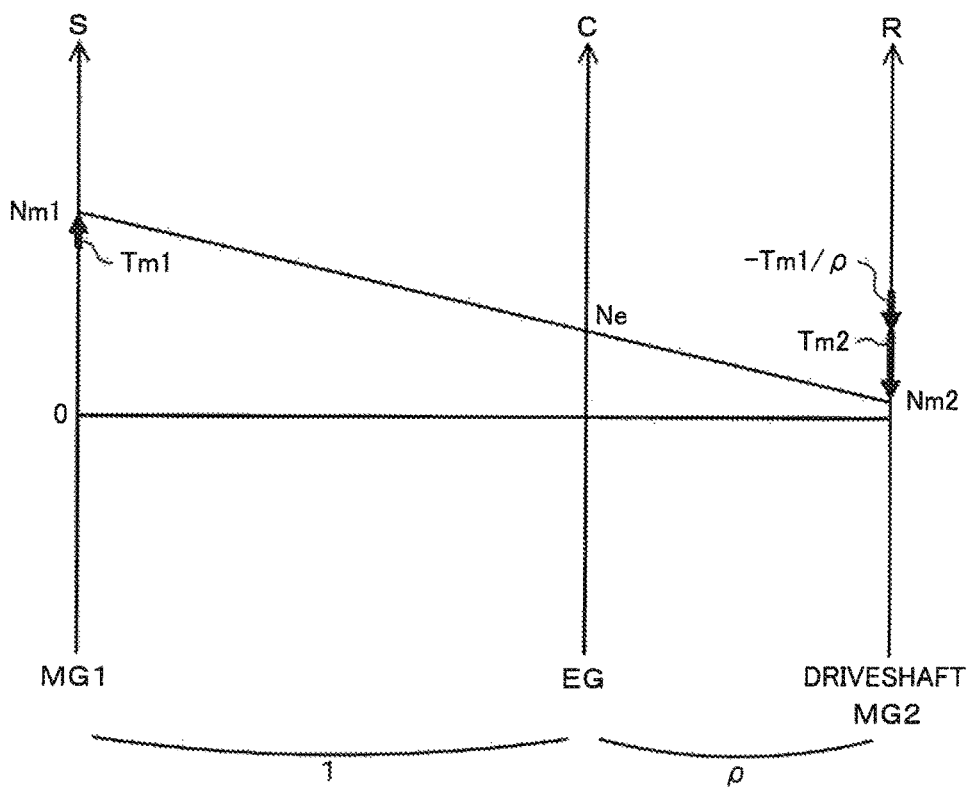
FIG. 12 is a diagram illustrating one example of the alignment chart when a negative torque is output from the motor MG2 and a positive torque is output from the motor MG1 in the case where the vehicle slides down at the shift position SP set to the R position in the battery-less drive mode.

FIG. 12 is a diagram illustrating one example of the alignment chart when a negative torque is output from the motor MG2 and a positive torque is output from the motor MG1 in the case where the vehicle slides down at the shift position SP set to the R position in the battery-less drive mode. As in the case of FIG. 7 described above, in the case of FIG. 12, regenerative drive of the motor MG2 is required, in order to output a torque according to the shift position SP (negative torque) from the motor MG2. In the battery-less drive mode, however, it is impossible to perform regenerative drive of both the motors MG1 and MG2. This modification accordingly performs the dq-axes consumption control as drive control of the motor MG1. More specifically, the dq-axes consumption control performs drive control of the motor MG1, such that a d-axis current and a q-axis current allowing for consumption of the electric power Pm2 of the motor MG2 in the form of power (torque) and heat is flowed in the motor MG1. In this case, both the torque (−Tm1/ρ) and the torque Tm2 are negative torques (torques for reverse driving). This configuration accordingly further increases a total torque in the reverse direction of the driveshaft 36 and thereby further suppresses an increase in speed of the slide-down of the vehicle. Compared with the configuration that performs the d-axis consumption control, this configuration also suppresses a temperature rise of the Motor MG1.

Figure 9:
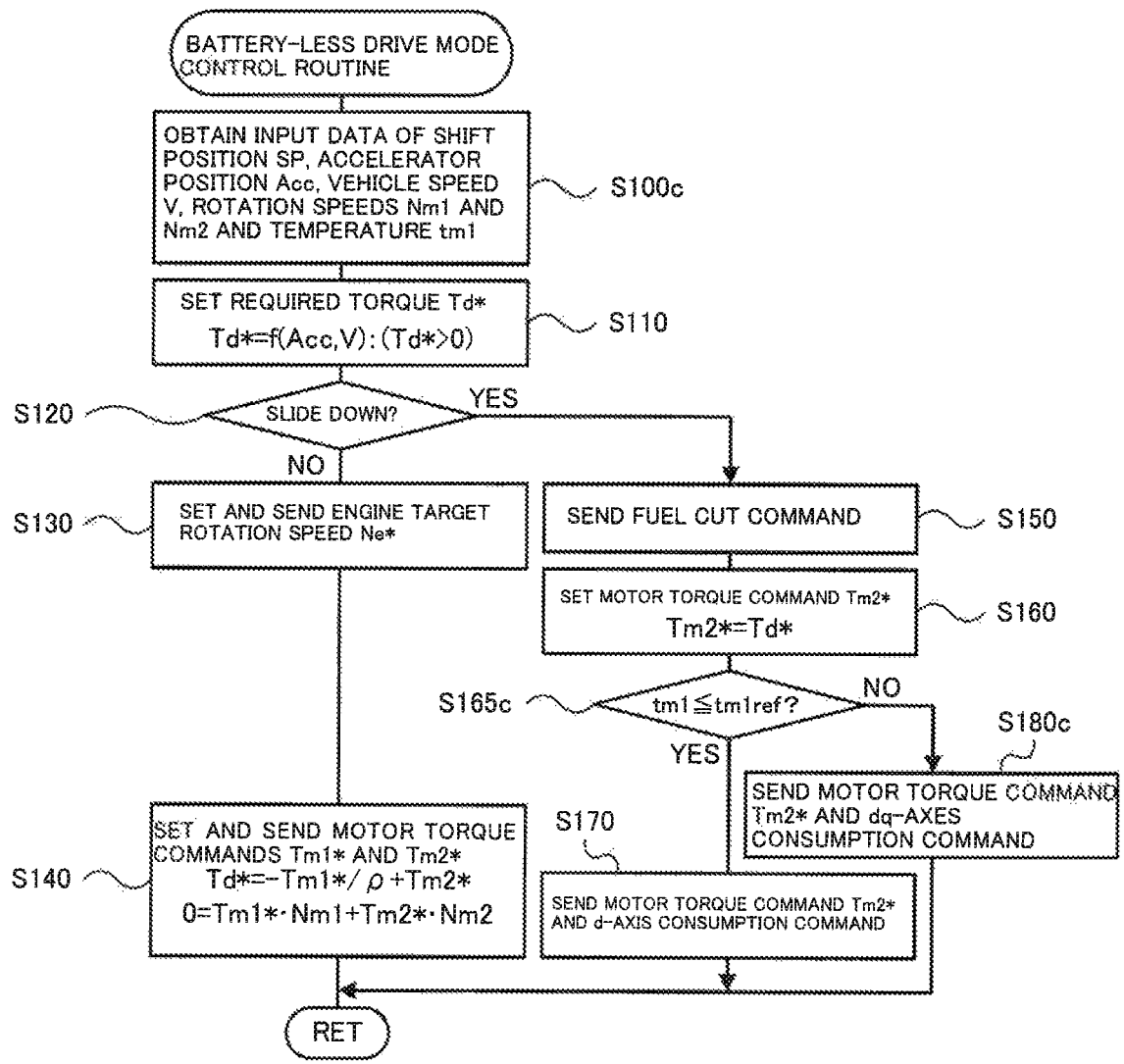
FIG. 9 is a flowchart showing one example of the battery-less drive mode control routine performed by the HVECU 70 according to another modification.

The following describes the battery-less drive mode control routine of FIG. 9. This routine is similar to the battery-less drive mode control routine of FIG. 3, except replacement of the processing of step S100 with the processing of step S100c and addition of the processing of steps S165c and S180c. The like steps in the battery-less drive mode control routine of FIG. 9 to those in the battery-less drive mode control routine of FIG. 3 are expressed by the like step numbers, and their detailed description is omitted.

In the battery-less drive mode control routine of FIG. 9, the HVECU 70 obtains input data, the temperature tm1 of the motor MG1, in addition to the shift position SF, the accelerator position Acc, the vehicle speed V and the rotation speed Nm1 and Nm2 of the motors MG1 and MG2 like the processing of step S100 in the battery less drive mode control routine of FIG. 3 (step S100c). The temperature tm1 of the motor MG1 input here is a value detected by the temperature sensor 45t and input from the motor ECU 40 by communication.

When it is determined at step S120 that the vehicle slides down, the HVECU 70 sends the fuel cut command for the engine 22 to the engine ECU 24 (step S150), sets the required torque Td* to the torque command Tm2* of the motor MG2 (step S160), and compares the temperature tm1 of the motor MG1 with a reference value tm1 ref (step S165c). The reference value tm1 ref is a threshold value used to determine whether the temperature tm1 of the motor MG1 is relatively high or not.

When the temperature tm1 of the motor MG1 is equal to or lower than the reference value tm1 ref, the HVECU 70 determines that the temperature tm1 of the motor MG1 is not relatively high, subsequently sends the torque command Tm2* of the motor MG2 and the d-axis consumption command to the motor ECU 40 (step S170) and then terminates this routine. When the temperature tm1 of the motor MG1 is higher than the reference value tm1 ref, on the other hand, the HVECU 70 determines that the temperature tm1 of the motor MG1 is relatively high, subsequently sends, the torque command Tm2* of the motor MG2 and the dq-axes consumption command to the motor ECU 40 (step S180c) like the processing of step S180b in the battery-less drive mode control routine of FIG. 8, and then terminates this routine.

As described above, this configuration suppresses an increase in speed of the slide-down of the vehicle, whether performing the d-axis consumption control or the dq-axes consumption control. When the temperature tm1 of the motor MG1 is equal to or lower than the reference value tm1 ref, the d-axis consumption control is performed to reduce the torque (to value 0) in the reverse direction that is applied from the motor MG1 to the driveshaft 36 via the planetary gear 30, compared with the dq-axes consumption control. When the temperature tm1 of the motor MG1 is higher than the reference value tm1 ref, on the other hand, the dp-axes consumption control is performed to suppress a temperature rise of the motor MG1, compared with the d-axis consumption control.

Figure 10:
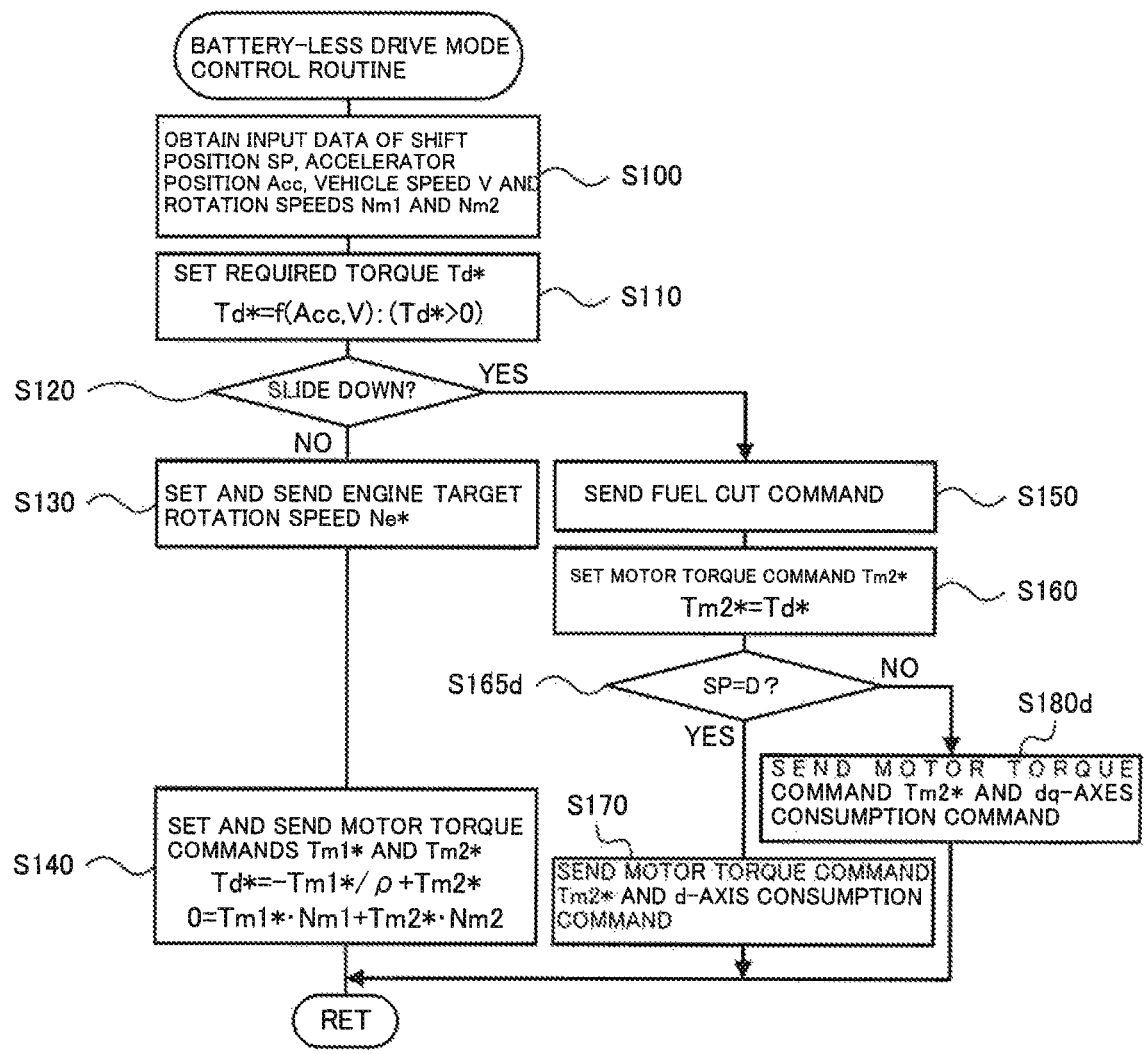
FIG. 10 is a flowchart showing one example of the battery-less drive mode control routine performed by the HVECU 70 according to another modification.

The following describes the battery-less drive mode control routine of FIG. 10. This routine is similar to the battery-less drive mode control routine of FIG. 3, except addition of the processing of steps S165d and S180d. The like steps in the battery-less drive mode control routine of FIG. 10 to those in the battery-less drive mode control routine of FIG. 3 are expressed by the like step numbers, and their detailed description is omitted.

In the battery-less drive mode control routine of FIG. 10, when it is determined et step S120 that the vehicle slides down, the HVECU 70 sends the fuel cut command for the engine 22 to the engine ECU 24 (step S150), sets the required torque Td* to the torque command Tm2* of the motor MG2 (step S160), and identifies whether the shift position SP is the D position or the R position (step S165d).

When it is identified that the shift position SP is the D position, the HVECU 70 sends the torque command Tm2* of the motor MG2 and the d-axis consumption command to the motor ECU 40 (step S170) and then terminates this routine. When it is identified that the shift position SP is the R position, on the other hand, sends the torque command Tm2* of the motor MG2 and the dq-axes consumption command to the motor ECU 40 (step S180d) like the processing of step S180b in the battery-less drive mode control routine of FIG. 8, and then terminates this routine.

As described above, this configuration suppresses an increase in speed of the slide-down of the vehicle, whether performing the d-axis consumption control or the dq-axes consumption control. When the shift position SP is the D position, the d-axis consumption control is performed to reduce the torque (to value 0) in the reverse direction that is applied from the motor MG1 to the driveshaft 36 via the planetary gear 30 and thereby suppress a decrease in total torque in the forward direction of the driveshaft 36, compared with the dq-axes consumption control. When the shift position SE is the R position, on the other hand, the dq-axes consumption control is performed to increase a torque in the reverse direction that is applied from the motor MG1 to the driveshaft 36 via the planetary gear and thereby increase the total torque in the reverse direction of the driveshaft 36, while suppressing a temperature rise of the motor MG1, compared with the d-axis consumption control.

The hybrid vehicle 20 of the embodiment is equipped with the step-up/down converter 55. According to a modification, the hybrid vehicle 20 may not be equipped with the step-up/down converter 55.

The hybrid vehicle 20 of the embodiment uses the battery 50 as the power storage device. According to a modification, the hybrid vehicle 20 may use a capacitor as the power storage device.

The hybrid vehicle 20 of the embodiment is equipped with the engine ECU 24, the motor ECU 40, the battery ECU 52 and the HVECU 70. According to a modification, at least two among these ECUs may be configured as a single electronic control unit The hybrid vehicle of this disclosure, the control device may be programmed to control the first motor such that the electric power generated by regenerative drive of the second motor is consumed without output of a torque from the first motor when the vehicle slides down during the predetermined drive. This configuration enables the electric power generated by regenerative drive of the second motor to be consumed in the form of heat without output of a torque from the first motor (with the flow of d-axis current).

The hybrid vehicle of this disclosure, the control device may be programmed to control the first motor such that the electric power generated by regenerative drive of the second motor is consumed by output of a torque in a direction of motoring the engine from the first motor by power drive of the first motor when the vehicle slides down during the predetermined drive. This configuration enables the electric power generated by regenerative drive of the second motor to be consumed in the form of power (torque) and heat by output of a torque in the direction of motoring the engine from the first motor by power drive of the first motor.

The hybrid vehicle of this disclosure, the control device may be programmed to control the first motor at a temperature of the first motor that is equal to or lower than a predetermined temperature such that the electric power generated by regenerative drive of the second motor is consumed without output of a torque from the first motor when the vehicle slides down during the predetermined drive (to perform a first consumption control), and the control device may be programmed to control the first motor at the temperature of the first motor that is higher than the predetermined temperature such that the electric power generated by regenerative drive of the second motor is consumed by output of a torque in a direction of motoring the engine from the first motor by power drive of the first motor when the vehicle slides down during the predetermined drive (to perform a second consumption control). This configuration enables the electric power generative by regenerative drive of the second motor to be consumed in the form of heat without output torque from the first motor (with the flow of d-axis current) or to be consumed in the form of power (torque) and heat by output of a torque in the direction of motoring the engine from the first motor by power drive of the first motor, according to the temperature of the first motor. Performing the first consumption control reduces a torque in a reverse direction that is applied from the first motor to the driveshaft via the planetary gear, compared with performing the second consumption control. Performing the second consumption control, on the other hand, suppresses a temperature rise of the first motor, compared with performing the first consumption control.

The hybrid vehicle of this disclosure, the control device may be programmed to control the first motor at the shift position set to a forward driving position such that the electric power generated by regenerative drive of the second motor is consumed without output of a torque from the first motor when the vehicle slides down during the predetermined drive (to perform a first consumption control) and the control device may be programmed to control the first motor at the shift position set to a reverse driving position such that the electric power generated by regenerative drive of the second motor is consumed by output of a torque in a direction of motoring the engine from the first motor by power drive of the first motor when the vehicle slides down during the predetermined drive (to perform a second consumption control). This configuration enables the electric power generative by regenerative drive of the second motor to be consumed in the form of heat without output of a torque from the first motor (with the flow of du-axis current) or to be consumed in the form of power (torque) and heat by output of a torque in the direction of motoring the engine from the first motor by power drive of the first motor, according to the shift position. When the first consumption control is performed, a torque in the reverse direction is not applied from the first motor to the driveshaft via the planetary gear. When the second consumption control is performed, on the other hand, a torque in the reverse direction is applied from the first motor to the driveshaft via the planetary gear. Accordingly, at the shift position set to the forward driving position, performing the first consumption control suppresses a decrease in total torque in the forward direction of the driveshaft, compared with performing the second consumption control. At the shift position set to the reverse driving position, on the other hand, performing the second consumption control increases the total torque in the reverse direction of the driveshaft, while suppressing a temperature rise of the first motor, compared with performing the first consumption control.

The following describe the correspondence relationship between the primary elements of the above embodiment and the primary elements of the disclosure described in Summary. The engine 22 of the embodiment corresponds to the "engine". The motor MG1 corresponds to the "first motor". The planetary gear 30 corresponds to the "planetary gear". The motor MG2 corresponds to the "second motor". The battery 50 corresponds to the "power storage device". The HVECU 70, the engine ECU 24 and the motor ECU 40 correspond to the "control device".

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The present disclosure is applicable to the manufacturing industries of hybrid vehicle.

The invention claimed is:

1. A hybrid vehicle, comprising:
   an engine;
   a first motor;
   a first inverter configured to drive the first motor;
   a planetary gear configured to include three rotational elements that are sequentially arrayed in an alignment chart and are respectively connected with the first motor, the engine, and a driveshaft coupled with drive wheels;
   a second motor connected with the driveshaft;
   a second inverter configured to drive the second motor;
   a power storage device configured to transmit electric power to and from the first motor and the second motor; and
   a relay configured to connect and disconnect the first motor and the second motor with and from the power storage device,
   the hybrid vehicle further comprising
   a control device programmed to, when the vehicle slides down during a predetermined drive of the hybrid vehicle with disconnection of the first motor and the second motor from the power storage device by the relay, control the second motor, such that a torque in a direction according to a shift position is output from the second motor by regenerative drive of the second motor and control the first motor, such that electric power generated by regenerative drive of the second motor is consumed by driving the first motor,
   wherein when the vehicle slides down during the predetermined drive,
   at a temperature of the first motor that is equal to or lower than a predetermined temperature, the control device is programmed to control the first motor, such that the electric power generated by regenerative drive of the second motor is consumed without output of a torque from the first motor, and
   at the temperature of the first motor that is higher than the predetermined temperature, the control device is programmed to control the first motor, such that the electric power generated by regenerative drive of the second motor is consumed by output of a torque in a direction of motoring the engine from the first motor by power drive of the first motor, and
   wherein the first inverter and the second inverter are controlled for driving when the first motor and the second motor are disconnected from the power storage device by the relay.

2. The hybrid vehicle according to claim 1,
wherein when the vehicle slides down during the predetermined drive, the control device is programmed to control the first motor, such that the electric power generated by regenerative drive of the second motor is consumed without output of a torque from the first motor.

3. The hybrid vehicle according to claim 1,
wherein when the vehicle slides down during the predetermined drive, the control device is programmed to control the first motor, such that the electric power generated by regenerative drive of the second motor is consumed by output of a torque in a direction of motoring the engine from the first motor by power drive of the first motor.

4. A hybrid vehicle, comprising:
an engine;
a first motor;
a first inverter configured to drive the first motor;
a planetary gear configured to include three rotational elements that are sequentially arrayed in an alignment chart and are respectively connected with the first motor, the engine, and a driveshaft coupled with drive wheels;
a second motor connected with the driveshaft;
a second inverter configured to drive the second motor;
a power storage device configured to transmit electric power to and from the first motor and the second motor; and
a relay configured to connect and disconnect the first motor and the second motor with and from the power storage device,
the hybrid vehicle further comprising
a control device programmed to, when the vehicle slides down during a predetermined drive of the hybrid vehicle with disconnection of the first motor and the second motor from the power storage device by the relay, control the second motor, such that a torque in a direction according to a shift position is output from the second motor by regenerative drive of the second motor and control the first motor, such that electric power generated by regenerative drive of the second motor is consumed by driving the first motor,
wherein when the vehicle slides down during the predetermined drive,
at the shift position set to a forward driving position, the control device is programmed to control the first motor, such that the electric power generated by regenerative drive of the second motor is consumed without output of a torque from the first motor, and
at the shift position set to a reverse driving position, the control device is programmed to control the first motor, such that the electric power generated by regenerative drive of the second motor is consumed by output of a torque in a direction of motoring the engine from the first motor by power drive of the first motor, and
wherein the first inverter and the second inverter are controlled for driving when the first motor and the second motor are disconnected from the power storage device by the relay.

5. The hybrid vehicle according to claim 4,
wherein when the vehicle slides down during the predetermined drive, the control device is programmed to control the first motor, such that the electric power generated by regenerative drive of the second motor is consumed without output of a torque from the first motor.

6. The hybrid vehicle according to claim 4,
wherein when the vehicle slides down during the predetermined drive, the control device is programmed to control the first motor, such that the electric power generated by regenerative drive of the second motor is consumed by output of a torque in a direction of motoring the engine from the first motor by power drive of the first motor.

* * * * *